US008989911B2

(12) United States Patent
Murai et al.

(10) Patent No.: US 8,989,911 B2
(45) Date of Patent: Mar. 24, 2015

(54) POWER CONSUMPTION MANAGEMENT SYSTEM, AND POWER CONSUMPTION MANAGER, POWER CONSUMPTION MANAGEMENT METHOD, POWER SUPPLY MANAGER, AND POWER SUPPLY MANAGEMENT METHOD, WHICH ARE USED FOR THE POWER CONSUMPTION MANAGEMENT SYSTEM

(75) Inventors: Masahiko Murai, Hachioji (JP); Yasuo Takagi, Chigasaki (JP); Nobutaka Nishimura, Koganei (JP); Yutaka Iino, Kawasaki (JP); Kenji Mitsumoto, Kawasaki (JP); Dai Murayama, Musashino (JP); Kazunori Iwabuchi, Chofu (JP); Yoshikazu Ooba, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 516 days.

(21) Appl. No.: 13/038,963

(22) Filed: Mar. 2, 2011

(65) Prior Publication Data
US 2011/0270459 A1 Nov. 3, 2011

(30) Foreign Application Priority Data
Apr. 28, 2010 (JP) ................................ P2010-103990

(51) Int. Cl.
*G06F 1/26* (2006.01)
*G06Q 10/06* (2012.01)
(Continued)

(52) U.S. Cl.
CPC ................ *G06Q 10/06* (2013.01); *G06Q 50/06* (2013.01); *H02J 3/14* (2013.01)
USPC ........................... 700/295; 700/291; 700/297

(58) Field of Classification Search
USPC .................................. 700/286, 291, 295, 297
See application file for complete search history.

(56) References Cited

U.S. PATENT DOCUMENTS 4,090,088 A * 5/1978 McMahon et al. .............. 307/38
2010/0191996 A1 7/2010 Iino et al.
(Continued)

FOREIGN PATENT DOCUMENTS

| JP | 2002-135977 | 5/2002 |
|----|-------------|--------|
| JP | 2002-271982 | 9/2002 |
| JP | 2007-129873 | 5/2007 |

(Continued)

OTHER PUBLICATIONS

Iino, Y. et al., "Energy Management System and Energy Management Method," U.S. Appl. No. 12/876,478, filed Sep. 7, 2010.

*Primary Examiner* — Carlos Ortiz Rodriguez
(74) *Attorney, Agent, or Firm* — Finnegan, Henderson, Farabow, Garrett & Dunner, L.L.P.

(57) ABSTRACT

A power consumption management system includes power consumption managers and a power supply manager. Each of the power consumption managers creates changeable power amount information with respect to a planned value of power consumption for each predetermined time range in a preset predetermined period in future, the planned value being related to a load of each piece of equipment in a building as a monitoring target. The power supply manager is connected to each of the power consumption managers through a network, decides a power change request amount for each building based on the created changeable power amount information, and transmits the decided power change request amount to each of the power consumption managers for the purpose of notification.

7 Claims, 3 Drawing Sheets

(51) Int. Cl.
*G06Q 50/06* (2012.01)
*H02J 3/14* (2006.01)

(56) References Cited

U.S. PATENT DOCUMENTS

2010/0222934 A1 9/2010 Iino et al.
2011/0106328 A1* 5/2011 Zhou et al. .................. 700/291

FOREIGN PATENT DOCUMENTS

JP 2009-77498 4/2009
JP 2009-177858 8/2009

* cited by examiner

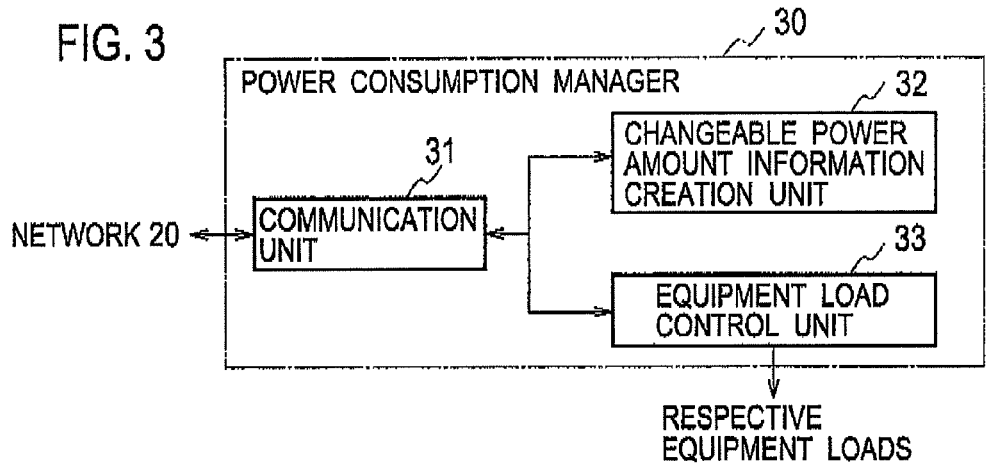
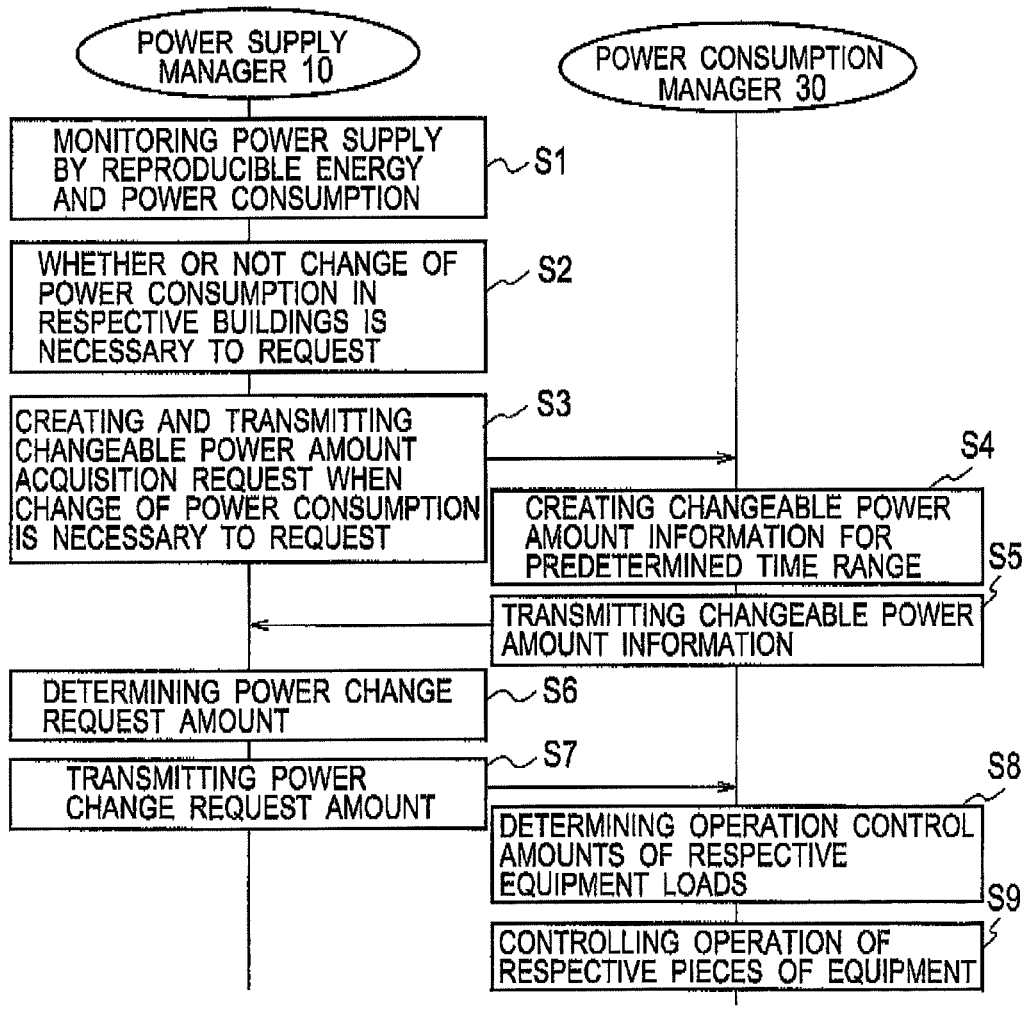

POWER CONSUMPTION MANAGEMENT SYSTEM, AND POWER CONSUMPTION MANAGER, POWER CONSUMPTION MANAGEMENT METHOD, POWER SUPPLY MANAGER, AND POWER SUPPLY MANAGEMENT METHOD, WHICH ARE USED FOR THE POWER CONSUMPTION MANAGEMENT SYSTEM

CROSS-REFERENCE TO RELATED APPLICATION

This Application is based upon and claims the benefit of priority from Japanese Patent Application No. 2010103990, filed Apr. 28, 2010; the entire contents of which are incorporated herein by reference.

FIELD

Embodiments described herein relate generally to a power consumption management system that manages power consumption of a facility such as a large building and a factory, and to a power consumption manager, a power consumption management method, a power supply manager, and a power supply management method, which are used for the power consumption management system.

BACKGROUND

In recent years, in order to reduce greenhouse effect gases such as carbon dioxide regarded as a cause of the global warming, further energy saving has been required in a facility such as a building and a factory. Following this, introduction of renewable energy generated from photovoltaic power generation and wind power generation, from which the greenhouse effect gases are not emitted at the time of power generation, has been being accelerated.

The renewable energy utilizes natural energy such as sunlight and wind power, which is taken out phenomena that repeatedly occur in the natural environment, and accordingly, has a disadvantage that there occur fluctuations such that an amount of power generation is reduced owing to a weather situation.

At present, a fluctuation amount of the power generation is absorbed by being compensated by outputs from thermal power generation and the like. However, it is apprehended that the fluctuation amount of the power generation may come not to be fully absorbed as an introduction ratio of the renewable energy is being enhanced.

As another means for absorbing the fluctuation amount of the power generation, it is conceived to utilize a storage battery and a standby generator. However, the storage battery has a problem that cost per unit power storage amount is high. Moreover, the standby generator has a problem that it costs to own assets, and that the standby generator concerned is inefficient since the standby generator consumes energy at the time of being on standby in an activated state.

BRIEF DESCRIPTION OF THE DRAWINGS

FIG. 3 is a block diagram illustrating a configuration of a power consumption manager of a power consumption management system according to one embodiment.

FIG. 4 is a sequence diagram illustrating operations of the power consumption management system according to one embodiment.

DETAILED DESCRIPTION

According to one embodiment, a power consumption management system for managing power consumption of one or more structures as management targets, which includes: a power supply manager that manages power supply to each of the structures; and a power consumption manager that is placed for each of the structures in order to manage the power consumption regarding a load of equipment of each of the structures and is connected to the power supply manager through a network. The power supply manager includes a management unit, a request unit, and a notification unit. The management unit determines whether or not it is necessary to request a change of the power consumption for each of the structures. The request unit transmits a changeable power amount acquisition request to the power consumption manager when the management unit determines that it is necessary to request the change of the power consumption for the structure. The notification unit acquires changeable power amount information transmitted from the power consumption manager based on the changeable power amount acquisition request transmitted from the request unit, decides a power change request amount for each of the structures based on the acquired changeable power amount information, and transmits the decided power change request amount to each of the power consumption managers for a purpose of notification. The power consumption manager includes an information creation unit and a control unit. Upon receiving the changeable power amount information acquisition request transmitted from the power supply manager, the information creation unit creates the changeable power amount information with respect to a planned value of the power consumption for each predetermined time range in a preset predetermined period in future, the planned value being related to a load of each piece of equipment in the structure, and transmits the created changeable power amount information to the power supply manager. The control unit acquires the power change request amount transmitted from the power supply manager based on the changeable power amount information of the power consumption, the changeable power amount information being transmitted from the information creation unit, decides an operation control amount of the load of each piece of the equipment in the structure based on the acquired power change request amount, and controls the applying load of the equipment.

Various Embodiments will be described hereinafter with reference to the accompanying drawings.

<Configuration of a Power Consumption Management System According to One Embodiment>

Figure 1:
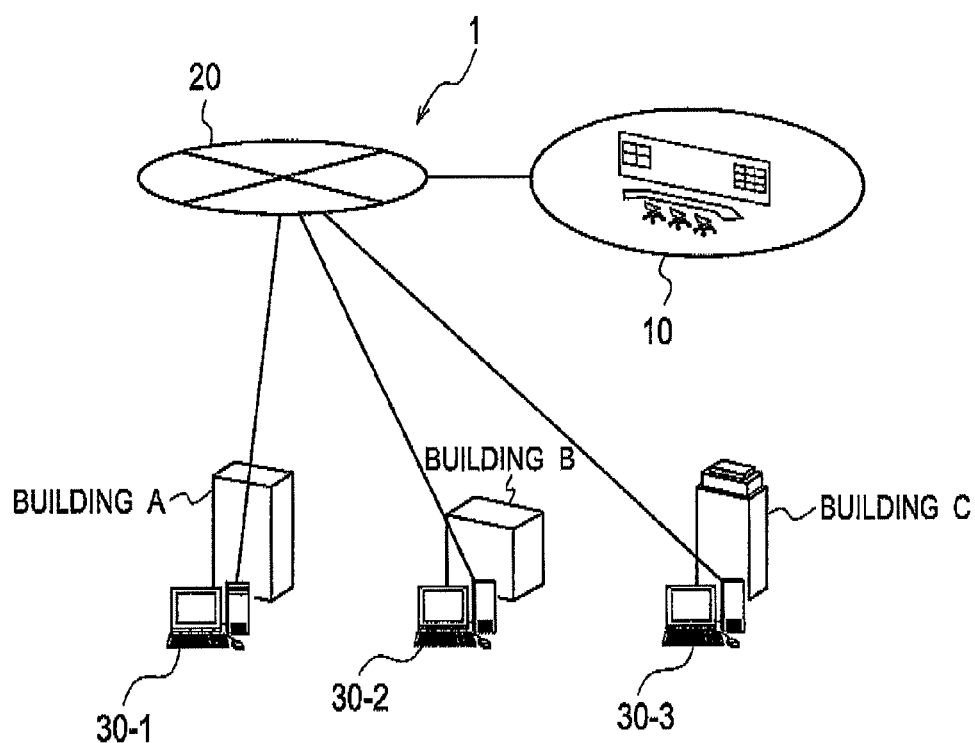
FIG. 1 is an overall view illustrating a configuration of a power consumption management system according to one embodiment.

A description is made of a configuration of power consumption management system 1 according to one embodiment with reference to FIG. 1.

The power consumption management system according to the embodiment includes a power supply manager 10 and power consumption managers 30. The power supply manager 10 is operated by a power company as a power system operator, and manages power supply to the respective buildings as management targets. The power consumption managers 30 are connected to the power supply manager 10 through a network 20, and monitor and control power consumption regarding loads of the respective pieces of equipment such as air conditioning equipment and lighting equipment of the plurality of buildings as the management targets.

In the power consumption management system 1 according to the embodiment, such structures which are the management targets are buildings A to C. The power consumption manager 30-1 monitors and controls the power consumption regarding the loads of the respective pieces of equipment of the building A as the management target. The power consumption manager 30-2 monitors and controls the power consumption regarding the loads of the respective pieces of equipment of the building B as the management target. The power consumption manager 30-3 monitors and controls the power consumption regarding the loads of the respective pieces of equipment of the building C as the management target.

Figure 2:
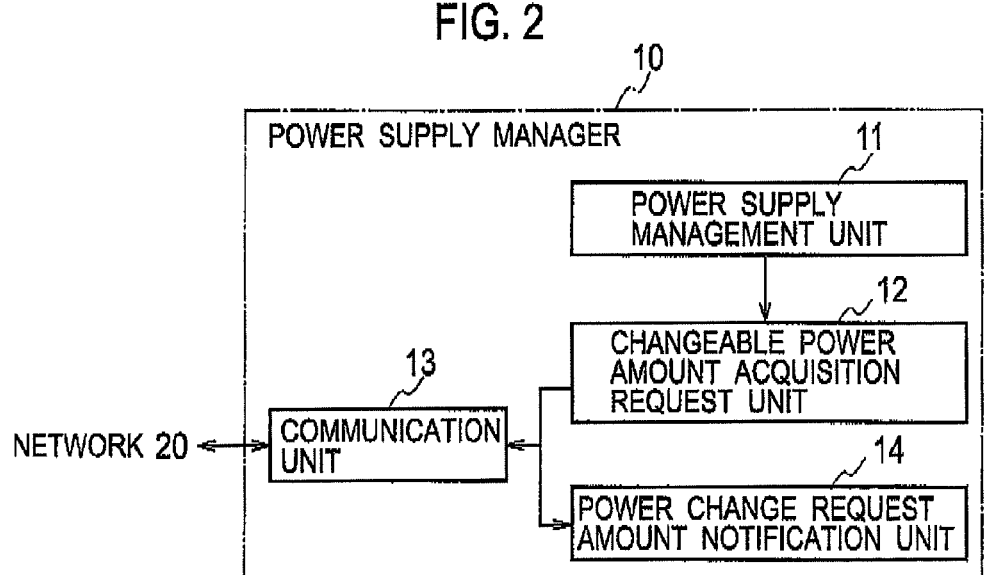
FIG. 2 is a block diagram illustrating a configuration of a power supply manager of the power consumption management system according to one embodiment.

As illustrated in FIG. 2, the power supply manager 10 includes a power supply management unit 11, a changeable power amount acquisition request unit 12, a communication unit 13, and a power change request amount notification unit 14.

The power supply management unit 11 monitors the past power consumption of the buildings A to C as the management targets, and monitors power supply by renewable energy generated from photovoltaic power generation, wind power generation and the like. In addition, the power supply management unit 11 adjusts power supply from each of thermal, hydraulic and atomic power plants and the like, and thereby adjusts a frequency and voltage of the power to be supplied. The power supply manager 10 determines whether or not it is necessary to request the structures managed thereby to increase or decrease the power consumption based on the power consumption concerned, the renewable energy, and the power supply from the power plants.

The changeable power amount acquisition request unit 12 creates a changeable power amount acquisition request for acquiring information regarding a changeable range of a power consumption amount when the power supply management unit 11 determines that it is necessary to make a request for such an increase or decrease of the power consumption. The created changeable power amount acquisition request is transmitted through the network 20 to the respective power consumption managers 30 (30-1, 30-2, 30-3) placed in the buildings (A, B, C) as the management targets.

The communication unit 13 performs communication with the respective power consumption managers 30 through the network 20.

The power change request amount notification unit 14 receives the changeable power amount acquisition request from the changeable power amount acquisition request unit 12, and thereby acquires changeable power amount information transmitted from the respective power consumption managers 30. Then, the power change request amount notification unit 14 decides power change request amounts for the respective buildings based on the acquired changeable power amount information, and transmits the decided power change request amounts to the respective power consumption managers 30 for the purpose of notification.

As illustrated in FIG. 3, each of the power consumption managers 30 includes a communication unit 31, a changeable power amount information creation unit 32, and an equipment load control unit 33.

The communication unit 31 performs communication with the power supply manager 10 through the network 20.

Upon acquiring the changeable power amount acquisition request transmitted from the power supply manager 10, the changeable power amount information creation unit 32 creates changeable power amount information with respect to a planned value of the power consumption for each predetermined time range in a preset predetermined period in the future, such as the next day and a day after a week, the planned value being related to the loads of the respective pieces of equipment in the building under monitor. Then, the created changeable power amount information is transmitted to the power supply manager 10.

The equipment load control unit 33 receives the changeable power amount information of the power consumption from the changeable power amount information creation unit 32, and thereby acquires the power change request amount transmitted from the power supply manager 10. Then, based on the acquired power change request amount, the equipment load control unit 33 decides and controls operation control amounts of the loads of the respective pieces of equipment so as to appropriately keep an environment in the building.

<Operation of the Power Consumption Management System According to One Embodiment>

Next, a description is made of operations executed in the power consumption management system 1 according to the embodiment with reference to a sequence diagram of FIG. 4.

First, in the respective power consumption managers 30, the power consumption of the buildings A to C as the management targets is monitored based on the past histories and the like, and a state of the power supply by the renewable energy generated from the photovoltaic power generation, the wind power generation, and the like based on information such as a weather forecast (S1).

At this time, when the change of the power supply of the renewable energy is predicted owing to a change of weather conditions, for example, when it is predicted that it will become cloudy or rainy according to the weather forecast, resulting in prediction that an amount of power generation by sunlight will be decreased, and when it is predicted that an amount of power generation by wind power will be decreased by prediction that a wind will be weakened, then it is determined whether or not a decreased amount of the power supply owing to the change of the weather conditions is adjustable by the power supply from the thermal, hydraulic and atomic power plants and the like. In such a way, it is determined whether or not it is necessary to request the change of the power consumption in the respective buildings A to C (S2).

Here, for example, when it is determined that it is necessary to request reduction of the power consumption in the respective buildings A to C, the changeable power amount acquisition request for acquiring information regarding a reducible range of the amount of the power consumption is created by the changeable power amount acquisition request unit 12. The created changeable power amount acquisition request is transmitted through the communication unit 13 and the network 20 to the power consumption managers 30 placed in the respective building's (S3).

In each of the power consumption managers 30, the changeable power amount acquisition request transmitted from the power supply manager 10 is acquired in the changeable power amount information creation unit 32 through the communication unit 31.

In the changeable power amount information creation unit 32, when the changeable power amount acquisition request is acquired thereby, there is created such changeable power amount information indicating reducible or increasable power consumption with respect to the planned value for each predetermined time range in the preset predetermined period in the future, the planned value being related to the loads of the respective pieces of equipment in the building (S4). In the power consumption management system 1 according to the embodiment, the changeable power amount information is created as pieces of every one hour in 24 hours of the next day.

Figure 5:
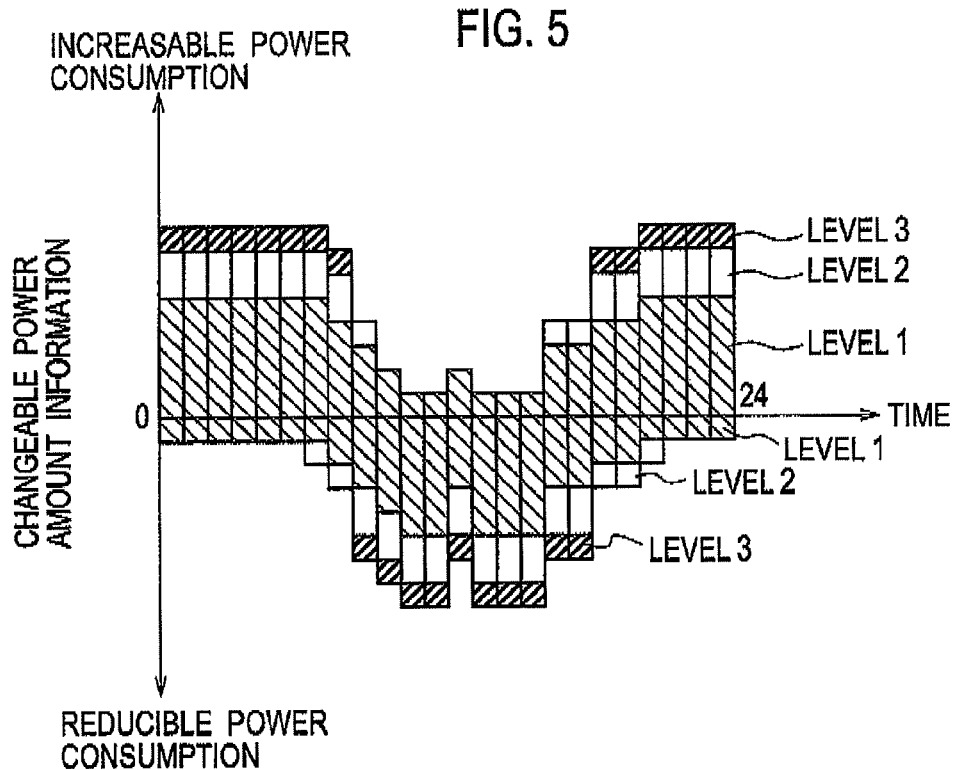
FIG. 5 is a graph illustrating an example of changeable power amount information created in the power consumption manager of the power consumption management system according to one embodiment.

FIG. 5 illustrates an example of the changeable power amount information created in the changeable power amount information creation unit 32.

FIG. 5 is a graph illustrating changeable power amounts when the planned values of the power consumption of every one hour are set at zero with regard to 24 hours of the next day.

Each of the changeable power amounts is set within a difference between the maximum power consumption that is based on a capacity of the load of each piece of equipment and the minimum power consumption required for the minimum operation, and is set at three levels in stages in response to a degree of necessity to change the power consumption.

Among them, a range where the power consumption is changeable immediately in response to the request from the power supply manager 10 is defined as a level 1, and when such a degree of necessity of an operation control for the load of the equipment is low, and a band to change the power consumption is small, then the power consumption is changed within the range of the level 1. Moreover, a range where the power consumption is changeable when the request cannot be sufficiently dealt with by the change amount of the level 1 is defined as a level 2, and when the degree of necessity of the operation control for the load of the equipment is higher than in the level 1, the power consumption is changed within the range of the level 2. A range where the power consumption is changeable when the request still cannot be sufficiently dealt with even by the change amount of the level 2 is defined as a level 3, and when the degree of necessity of the operation control for the load of the equipment is much higher than in the level 2, the power consumption is changed within the range of the level 3.

The changeable power amount information created in the changeable power amount information creation unit 32 is transmitted to the power supply manager 10 through the communication unit 31 (S5).

In the power supply manager 10, the changeable power amount information transmitted from the respective power consumption managers 30 is acquired by the power change request amount notification unit 14 through the communication unit 13.

Upon acquiring the changeable power amount information, the power change request amount notification unit 14 decides the power change request amounts for the respective buildings A to C based on the changeable power amount information of the respective buildings A to C and on the power consumption for which it is determined in Step S2 that the change is necessary (56).

At this time, it is preferable to decide the power change request amounts so that the power change request amounts concerned cannot exceed the changeable power amounts for all the buildings A to C as the management targets, and can be set at the level of the same degree of necessity.

The power change request amounts decided in the power change request amount notification unit 14 are individually transmitted through the communication unit 13 to the applying power consumption managers 30 (S7).

Each of the power consumption managers 30 acquires the power change request amount, which is transmitted from the power supply manager 10, by the equipment load control unit 33 through the communication unit 31.

Upon acquiring the power change request amount, the equipment load control unit 33 decides the operation control amounts of the loads of the respective pieces of equipment based on the acquired power change request amount so as to appropriately keep the environment in the building as the management target (S8).

Then, the loads of the respective pieces of environment are controlled based on the operation control amounts decided by the equipment load control unit 33 (S9), and are operated so that the power consumption can be changed in response to the request from the power supply manager 10.

Figure 6:
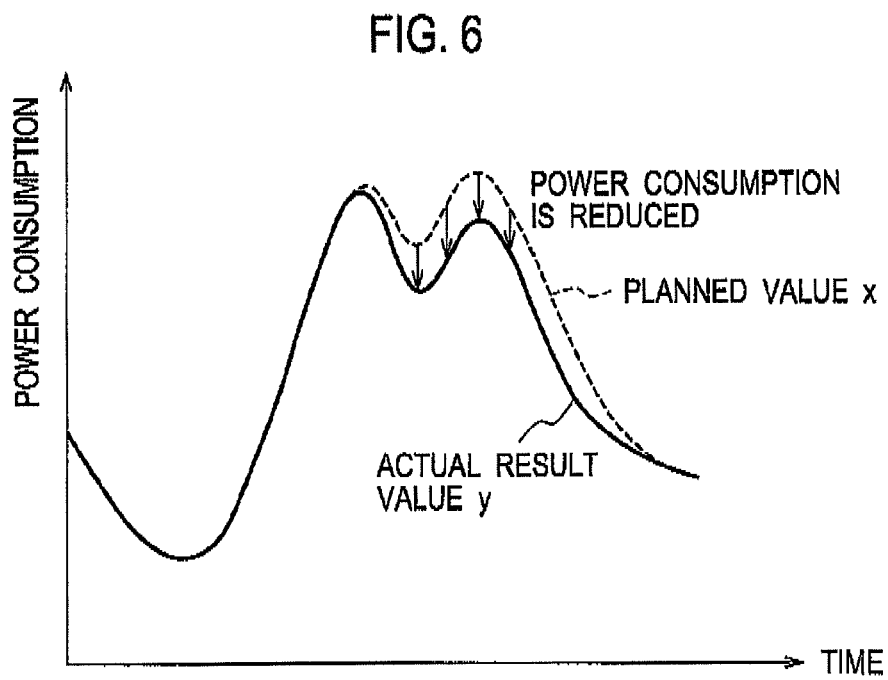
FIG. 6 is a graph illustrating an example of power consumption reduced by the power consumption management system according to one embodiment.

FIG. 6 illustrates an example of the change of the power consumption in such an equipment load in the building as the management target in a day when the control is performed according to the request from the power supply manager 10 as described above.

In FIG. 6, a planned value x of the power consumption in the equipment load in the day concerned is indicated by a broken line, and an actual result value y of the actual power consumption in the equipment load concerned is indicated by a solid line. Here, it is illustrated that the power consumption is reduced by amounts of arrows by the request from the power supply manager 10.

As described above, in accordance with the power consumption management system 1 according to the embodiment, for the fluctuation of the power supply within the limited time range, the changeable power amount information of the power consumption for each structure as the management target can be acquired in advance, and based on the acquired changeable power amount information, notices on such change requests of the power consumption can be fairly issued to the structures. Therefore, in the power consumption management system 1 according to the embodiment, the power consumption can be controlled efficiently.

<Other Embodiments>

In the power consumption management system 1 according to the above-mentioned embodiment, the description has been made of the case of creating the changeable power amount information with respect to the planned value of the power consumption in every one hour in 24 hours of the next day, the planned value being related to the loads of the respective pieces of equipment in the building under monitor in each of the power consumption managers 30. However, embodiments of the present invention are not limited to this. In other embodiments, such a period as the creation target of the changeable power amount information may be set at, for example, a time from the current point of time to 24 o'clock in this day, 24 hours in a day in one week after this day, or 168 hours from the next day to one week ahead. Moreover, changeable power amount information with respect to a planned value of the power consumption in every 30 minutes may be created. In such a way, the period as the creation target of the changeable power amount information is changeable to varieties of periods and time ranges.

Moreover, in the power consumption management system according to the above-mentioned embodiment, the description has been made of the case where the power consumption is reduced according to the request from the power supply manager 10. However, embodiments are not limited to this, and can also be applied to the case where the power consumption is increased. For example, in the case where it is predicted that the supply of the power becomes excessive in atomic power generation in which it is difficult to suddenly vary an amount of power generation, it is conceived that embodiments are applied to an occasion of issuing an increase request from a power supply manager to a structure as a management target.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power consumption management system for managing power consumption of one or more structures as management targets, comprising:
 a power supply manager that manages power supply to each of the structures; and
 a plurality of power consumption managers each placed for each of the structures in order to manage the power consumption regarding a load of equipment of each of the structures, the one or more power consumption managers connected to the power supply manager through a network, wherein
 the power supply manager comprises:
  a management unit that determines whether or not it is necessary to request a change of the power consumption for the structures;
  a request unit that transmits a changeable power amount acquisition request to the plurality of power consumption managers when the management unit determines that it is necessary to request the change of the power consumption for the structures; and
  a notification unit that acquires changeable power amount information transmitted from each of the plurality of power consumption managers based on the changeable power amount acquisition request transmitted from the request unit, decides a power change request amount for each of the structures based on a plurality of changeable power amount information acquired from the plurality of power consumption managers, and transmits the decided power change request amount to each of the plurality of power consumption managers for a purpose of notification, the changeable power amount information including a range in which a power consumption is changeable, and
 each of the plurality of power consumption managers comprises:
  an information creation unit that, upon receiving the changeable power amount information acquisition request transmitted from the power supply manager, creates the changeable power amount information with respect to a planned value of the power consumption for each predetermined time range in a preset predetermined period in future, the planned value being related to the load of the equipment of each of the structures, and transmits the created changeable power amount information to the power supply manager; and
  a control unit that acquires the power change request amount transmitted from the power supply manager based on the changeable power amount information of the power consumption, the changeable power amount information being transmitted from the information creation unit, decides an operation control amount of the load of the equipment of each of the structures based on the acquired power change request amount, and controls the applying load of the equipment.

2. A power consumption manager that is connected through a network to a power manager managing power supply to one or more structures as management targets, and is placed for each of the structures in order to manage power consumption regarding a load of equipment of each of the structures, the power consumption manager comprising:
 an information creation unit that, upon acquiring a changeable power amount information acquisition request for requesting a change of the power consumption, the changeable power amount information acquisition request being transmitted from the power supply manager, creates changeable power amount information with respect to a planned value of the power consumption for each predetermined time range in a preset predetermined period in future, the planned value being related to the load of the equipment of each of the structures as a monitoring target, and transmits the created changeable power amount information to the power supply manager, the chargeable power amount information including a range in which a power consumption is changeable; and
 a control unit that acquires a power change request amount decided by the power supply manager based on a plurality of changeable power amount information, one of the plurality of changeable power amount information being transmitted from the information creation unit, decides an operation control amount of the load of the equipment of each of the structures based on the acquired power change request amount, and controls the applying load of the equipment.

3. The power consumption manager according to claim 2, wherein
 the preset predetermined period in the future is 24 hours in a next day, a time from a current point of time to 24 o'clock in this day, 24 hours in a day in one week after this day, or 168 hours from the next day to one week ahead, and
 the predetermined time range is a 30-minute range or a one-hour range.

4. The power consumption manager according to claim 2 or 3, wherein
 the changeable power amount information created by the information creation unit includes ranges divided into a plurality of levels.

5. A power consumption management method by a power consumption manager that is connected through a network to a power supply manager managing power supply to one or more structures as management targets, and is placed for each of the structures in order to manage power consumption regarding a load of equipment of each of the structures, the power consumption management method comprising:
 a first step of, upon acquiring a changeable power amount information acquisition request for requesting a change of the power consumption, the changeable power amount information acquisition request being transmitted from the power supply manager, creating changeable power amount information with respect to a planned value of the power consumption for each predetermined time range in a preset predetermined period in future, the planned value being related to the load of the equipment of each of the structures as a monitoring target, and transmitting the created changeable power amount information to the power supply manager, the changeable power amount information including a range in which a power consumption is changeable; and a second step of acquiring a power change request amount decided by the power supply manager based on a plurality of changeable power amount information of the power consumption, one of the plurality of changeable power amount information being transmitted in the first step, deciding an operation control amount of the load of the equipment of each of the structures based on the acquired power change request amount, and controlling the applying load of the equipment.

6. A power supply manager that is connected through a network to a plurality of power consumption managers managing power consumption regarding a load of equipment of each of a plurality of structures as management targets, the plurality of power consumption managers being placed for the structures, the power supply manager managing power supply to the structures comprising:
   a management unit that determines whether or not it is necessary to request a change of the power consumption for the structures;
   a request unit that transmits a changeable power amount acquisition request to the plurality of power consumption managers when the management unit determines that it is necessary to request the change of the power consumption for the structures; and
   a notification unit that acquires a plurality of changeable power amount information created in the plurality of power consumption managers based on the changeable power amount acquisition request transmitted from the request unit, the changeable power amount information including a range in which a power consumption is changeable and being with respect to a planned value of the power consumption regarding the load of the equipment of each of the structures as a monitoring target in a preset predetermined period in future, decides a power change request amount for each of the structures based on the plurality of changeable power amount information acquired from the plurality of power consumption managers, and transmits the decided power change request amount to each of the power consumption managers for a purpose of notification.

7. A power supply management method by a power supply manager that is connected through a network to a plurality of power consumption managers each managing power consumption regarding a load of equipment of each of one or more structures as management targets, each of the plurality of power consumption managers being placed for each of the structures, the power supply management method managing power supply to each of the structures comprising:
   a first step of determining whether or not it is necessary to request a change of the power consumption for the structures;
   a second step of transmitting a changeable power amount acquisition request to the plurality of power consumption managers when the first step determines that it is necessary to request the change of the power consumption for the structures; and
   a third step of acquiring a plurality of changeable power amount information created in the plurality of power consumption managers based on the acquired changeable power amount acquisition request transmitted in the second step, the changeable power amount information including a range in which a power consumption is changeable and being with respect to a planned value of the power consumption regarding the load of the equipment of each of the structures as a monitoring target in a preset predetermined period in future, deciding a power change request amount for each of the structures based on the plurality of changeable power amount information, and transmitting the decided power change request amount to each of the one or more power consumption managers for a purpose of notification.

* * * * *